United States Patent Office 2,912,359
Patented Nov. 10, 1959

2,912,359

WOUND HEALING AGENT OBTAINED FROM BLOOD AND METHOD OF PREPARATION

Ludwik Anigstein, Dorothy M. Whitney, and Don W. Micks, Galveston, Tex.; said Dorothy M. Whitney now by change of name Dorothy M. Anigstein, assignors of fifteen percent to Developments Incorporated, Houston, Tex., a corporation of Texas, and thirty-five percent to The Board of Regents of the University of Texas No Drawing. Application May 4, 1955
Serial No. 506,086

13 Claims. (Cl. 167—74)

This invention relates to a wound healing agent and a method of its preparation and, more particularly, relates to such a wound healing agent and method which is a blood derivative from animal blood.

In recent years a search has been made to elaborate biological methods for treatment of chronic ulcers, particularly on legs. The beneficial effect of direct application of fresh human red blood cells on ulcerative wounds was noted by Moorhead and Unger in 1943, vol. 59, Am. J. Surg., pp 104–105. Although these ulcers are difficult to cure and sometimes are incurable, the application of fresh human blood induced epithelization and healing as reported by M. Naide, Am. J. Med. Sci., vol. 205, pp. 489–493 in 1943. Considerable difficulty is encountered, however, in attempting to keep fresh blood on hand for frequent treatment and fresh human red blood cells are not readily available in quantity for this purpose.

Accordingly, it is an object of the present invention to provide a wound healing agent and a process for producing such a wound healing agent from blood which accelerates the rate of wound healing.

It is yet a further object of the present invention to provide a method of producing a substance from animal blood and the substance which accelerates the rate of wound healing in which the source of materials are readily and conveniently available and inexpensive and which method is relatively simple and inexpensive to carry out.

A more particular object of the present invention is the provision of a process for the production of a blood derivative from animal blood and the blood derivative which accelerates the rate of wound healing.

Other and further objects and features will be apparent from the following description of preferred embodiments of the invention.

In accordance with the present invention a wound healing agent may be produced readily from convenient, inexpensive and abundant source materials by a relatively simple method. Source materials, such as blood, erythrocytes, hemoglobin and fractions from any warm blooded animal may be used, such as rabbits, dogs, horses, cattle and the like, as well as human beings although due to its general availability in large quantities, bovine blood is preferred.

In the present invention hemoglobin of various animals or man is subjected to enzymatic hydrolysis until a product is obtained which is a greenish-brown odorless liquid with yellowish iridescent foam at which time the hydrolysis is discontinued. The end point of the hydrolyzing action is definitely indicated by this characteristic product having a pH of about 7.4 consisting of a greenish-brown odorless liquid having a yellowish and iridescent foam (on shaking) which prior to that time is a pinkish-red foam (pH 8.5). Salt is then removed from the hydrolyzate, such as by dialysis, and the material is flocculated or precipitated and the supernatant liquid discarded. At this time the pH of the desalted hydrolysate is about 7.6 and at the end point of the hydrolysis the pH is about 7.4. The flocculated or precipitated material is then adjusted to a pH of about 7.0 and lyophilized resulting in a dark brown, fluffy powder which when applied to an ulcerative skin area exhibits remarkable wound healing properties. This final dark brown fluffy powder has little or none of its original protein material as evidenced by its solubility in methyl and amyl alcohol and water and its insolubility in ether or propylene glycol and negative biuret test. This product is further characterized in that spectral data indicate iron is present in ferrous rather than ferric form more closely resembling oxyhemoglobin than hematin. Also, the final material shows an absence of amino acids by chromatographic analysis made at the end of the hydrolysis period.

For best results the blood is carefully prepared for hydrolyzing. In general the blood is mechanically defibrinated and filtered, hemolyzed and desiccated, such as by lyophilizing. The desiccated blood is then subjected to hydrolyzing as previously described.

The hydrolyzing is done by enzymatic hydrolysis by any suitable hydrolyzing proteolytic enzyme under the conditions of temperature and hydrogen ion concentration favorable to the action of the enzyme. For example, crude trypsin or other endopeptidases, such as chymotrypsin, carboxypeptidase, may be used with the mixture being maintained in the neighborhood of 37° C. and at a pH from about 6.0 to 9.0. Also a complex of enzymes such as a complex of pancreatic enzymes may be used. In addition papain may be used as well as others.

As mentioned previously, careful attention should be given to the degree of hydrolysis of the blood protein as this is critical. Excesisve hydrolysis results in a product which exhibits little if any wound healing properties. In this connection the length of time will vary with the type and concentration of hydrolyzing agents and the temperatures used, the end point in all cases, however, is definitely marked by the appearance of a greenish-brown odorless liquid having a yellowish iridescent foam having a pH of about 7.4. At this time, the hydrolysis should be stopped or discontinued. Prior to the formation of this material, the foam is a pinkish-red color. The blood base being hydrolyzed should be shaken from time to time so that this end point determination may be made.

By way of illustration the following specific examples are given as typical procedures for producing a wound healing agent from the designated source material.

*Example I*

This example illustrates a presently preferred method of making the wound healing agent. About 8 liters of fersh blood was obtained from the jugular vein of cattle with aseptic precautions before slaughtering and collected into a tall (18 x 6 inch) sterilized Pyrex glass cylinder. The blood was vigorously stirred with sterilized wooden rods until a large fibrin clot was formed which was discarded. This blood defibrination took about fifteen to about twenty minutes. The liquid blood was placed in a refrigerator at about 4 to 5° C. for rapid cooling overnight and then filtered through a layer of gauze and cotton and placed in a cellophane tubing for dialysis against frequently changed tap water for a period of twenty-four hours. This resulted in the blood being hemolyzed and the dark, hemolyzed blood was removed from the cellophane tubing and placed in paper containers and frozen solid. The contents of the containers were then lyophilized (freeze dried) and this desiccated blood base was used as the material to be hydrolyzed.

The enzymatic proteolysis was carried out by the subjecting the desiccated blood base to enzymatic hydrolysis by the action of complex pancreatic enzymes contained in 4 x U.S.P. pancreatin. This enzymatic complex consisted of trypsin, amylase, lipase, carboxypeptidase, chymotrypsin and ribonuclease.

The hydrolysis was carried out by placing 3 liters of 1/10 molar disodium hydrogen phasphate (14.2 gm. anhydrous powder per liter) in a sterile container and adding 4 gm. pancreatin while stirring. To this, 45 gm. desiccated blood base (pH 8.5) was added and placed in a water bath for eight hours at 37° C. and then refrigerated overnight (12 to 14 hours) at 4 to 5° C. The container was removed from the refrigerator and warmed in 37° C. water for an hour followed by 70° C. for forty-five minutes, at which time a greenish-brown odorless liquid with a yellowish iridescent foam appeared (pH 7.4). This was cooled and filtered through a layer of gauze and cotton and placed in a cellophane tube and dialyzed against tap water under frequent changes for fifteen to twenty hours at room temperature for the purpose of removing salts (phosphates). The material contained in the cellophane tubing was poured into a Pyrex container and the pH adjusted to 4.7 with dilute HCl (4–5%). At this point rapid flocculation took place which was allowed to settle for about two hours. The supernatant liquid was then discarded by siphoning under suction and the sediment was separated by centrifugation and collected in Erlenmeyer flasks. This material was adjusted to a pH of 7.0 with 1 1/10 molar disodium hydrogen phosphate and was then lyophilized.

The resultant material was a dark brown, fluffy powder which represented about 10% of the original blood base. On the basis of this example 8 liters of whole bovine blood delivered approximately 120 gm. of final product.

The resulting product is one of proteolytic degradation of hemoglobin and is believed to be a complexity of compounds rather than a single entity. The pancreatic digestion of hemoglobin leaves little or none of the protein material in the final product as evidenced by its solubility in ethyl and amyl alcohol as well as water and its insolubility in ether and propylene glycol. The biuret test of a solution of the final powder gave negative results and spectral data indicated that iron is present in ferrous rather than ferric more closely resembling oxyhemoglobin than hematin. At the end of the hydrolysis and dialysis, chromatographic analysis showed absence of amino acids, all as previously mentioned.

The wound healing agent prepared in accordance with this example has remarkable wound healing properties particularly in the treatment of chronic, surface ulcerations. The treatment of such ulcerations, particularly of the lower extremities, presents a serious problem to the medical profession. These ulcers are either local in character due to damage of varicose veins, to susceptibility to infections (tropical ulcers) or are based on general metabolic disturbances such as Buerger's disease, diabetes, arteriosclerosis, and the like. The slow healing process of these conditions is characteristic and discouraging.

In treating these ulcers the dark brown powder prepared in accordance with Example I was sprinkled over the ulcerative surface and the area was covered with a gauze dressing. These dressings were reapplied daily or at longer intervals depending on the case.

Regardless of the severity of the case and the degree of the tissue damage and contamination, the responses of the tissue to the treatment consisted in debridement, stimulation of granulation tissue and epithelization. The stimulation of granulation tissue and circulatory enhancement were prominent features followed by epithelization of the skin edges of the ulcer and by epithelium islets formation on the granulation surface. In all cases treated the response to treatment was favorable to excellent.

*Example II*

0.1 gm. of lyophilized erythrocytes was dissolved in 5 cc. of 0.2 M phosphate buffer. 0.1 ml. of 5% trypsin (Pfanstiehl, crude) was added to the mixture which was then incubated for five hours at 37° C. in a water bath. This material was then heated for thirty minutes at 65° C. at which time the characteristic yellowish iridescent foam on a greenish-brown odorless liquid appeared indicating the end point of the hydrolysis at which time hydrolysis was discontinued. The material was then lyophilized. Preferably, the salts are removed by dialysis as in Example I thus concentrating the active substances. This is preferable as the elimination of unnecessary salts definitely contributes to the quality of the product. This product is also effective in topical applications for wound healing as mentioned in connection with Example I although the wound healing properties were not as marked as those of the product of Example I.

*Example III*

0.1 gm. of lyophilized bovine hemoglobin was dissolved in 5 cc. of 0.1 M sodium hydroxide. This mixture was then heated for thirty minutes at a temperature of 65° C. It was then adjusted to a pH between 7.0 and 7.8 with normal HCl. At this point trypsin (Pfanstiehl, crude) was added and the substance hydrolyzed until a greenish-brown odorless liquid with a yellowish iridescent foam was obtained at which time the hydrolysis was discontinued. It is noted that the substance was not permitted to be completely hydrolyzed, but only to the point as indicated. This product also exhibits wound healing properties as mentioned previously and preferably has the salts removed and its pH adjusted to 7.0.

*Example IV*

0.1 gm. of lyophilized bovine hemoglobin was dissolved in 5 ml. 0.2 M phosphate buffer pH 7.2. 0.1 ml. of 5% papain (Merck) was added to the mixture which was then incubated for five hours at 37° C. in a water bath and then heated for thirty minutes at 65° C. at which time the end point of the hydrolysis was indicated by the formation of the characteristic greenish-brown odorless liquid with a yellowish iridescent foam. This material was dialyzed to remove salt and the pH adjusted to about 7.0 to 7.2. This material also exhibited wound healing properties as mentioned previously.

As indicated, the pH value of the protein hydrolysate is adjusted to about the normal pH value of tissue or blood, and 7.0 to about 7.8 is satisfactory although 7.0 is preferred. Any active proteolytic enzyme may be used, but best results were obtained when using pancreatic endopeptidases. For example, the enzymatic complex consisting of trypsin, amylase, lipase, carboxypeptidase, chymotrypsin and ribonuclease, as well as others may be used. As mentioned, the extent of the hydrolysis is critical and hydrolysis should be discontinued when a product is obtained which is an odorless dark brown liquid having a yellowish iridescent foam. The length of time of hydrolysis will vary with the amount and concentrations of the enzymes used, the type and source of enzyme used, as well as the temperature used.

Best results are obtained by eliminating the unnecessary salts (phosphates), thus concentrating the active substances, such as by dialysis and the remains may be in solution at a pH of 7.0 to about 7.2 and oven dryed or lyophilized or may be precipitated or flocculated by adjusting the pH to about 4.5 to 5.0 and then washed, and lyophilized.

While best results have been obtained by sprinkling the powder on the surface of the wound, it may be used as an ointment in a suitable inert carrier if desired.

It is understood that the present wound healing agent is useful as a wound healing agent for topical or local applications externally applied and not as an antibiotic applied internally.

The present invention is therefore well suited to carry out the objects and attain the ends and advantages mentioned as well as others inherent therein. Numerous changes in operating conditions will readily suggest themselves to those skilled in the art which are encompassed within the spirit of the invention and the scope of the appended claims.

This application is a continuation-in-part of application Serial No. 160,826 filed May 8, 1950, now abandoned.

What is claimed is:

1. A process of preparing a wound healing agent from a hemolyzed blood comprising subjecting the hemolyzed blood to hydrolysis with a proteolytic enzyme until a product is obtained consisting of a greenish-brown odorless liquid having a yellowish iridescent foam, and discontinuing the hydrolysis.

2. The process of claim 1 in which the hydrolysis takes place in a medium having a pH between 6 and 9.

3. A process of preparing a wound healing agent from hemolyzed blood comprising subjecting the hemolyzed blood to hydrolysis with a proteolytic enzyme until a product is obtained consisting of a greenish-brown odorless liquid having a yellowish iridescent foam, discontinuing the hydrolysis, and removing salts from the product.

4. A process of preparing a wound healing agent from hemolyzed blood comprising subjecting the hemolyzed blood to hydrolysis with a proteolytic enzyme until a product is obtained consisting of a greenish-brown odorless liquid having a yellowish iridescent foam, discontinuing the hydrolysis, removing phosphate from products of hydrolysis, adding acid to the products of hydrolysis thereby causing them to form a flocculent precipitate and a supernatant liquid, discarding the supernatant liquid, and then adding a base to the flocculent precipitate in a sufficient amount to bring its pH to about 7.0.

5. The process of claim 4 where the proteolytic enzyme is a complex of pancreatic enzymes.

6. The process of claim 4 where the proteolytic enzyme is trypsin.

7. The process of claim 4 where the proteolytic enzyme is papain.

8. A process of preparing a wound healing agent from defibrinated bovine blood comprising, hemolyzing the blood, desiccating the hemolyzed blood, dissolving the desiccated blood in a buffer solution having a pH between about 7 and 7.8, subjecting the desiccated blood in the said buffer solution to hydrolysis with a proteolytic enzyme until a product is obtained consisting of a greenish-brown odorless liquid having a yellowish iridescent foam, discontinuing the hydrolysis, removing salts from products of hydrolysis, adding acid to the products of hydrolysis thereby causing them to form a flocculent precipitate and a supernatant liquid, discarding the supernatant liquid, adding a base to the flocculent precipitate in a sufficient amount to adjust its pH to about 7.0, and lyophilizing the resulting product.

9. The process of claim 8 where the proteolytic enzyme is a complex of pancreatic enzymes and the desiccated blood in the buffer solution is hydrolyzed at about 37° C. for a period of about eight hours, then hydrolyzed at about 4 to 5° C. for a period of about ten to about fourteen hours, then hydrolyzed at a temperature of about 37° C. for a period of about one hour, and then hydrolyzed at 70° C. until the greenish-brown odorless liquid having a yellowish iridescent foam is obtained.

10. A wound healing agent obtained by hydrolyzing hemolyzed blood by a proteolytic enzyme in a medium having a pH between 6 and 9 until a product is obtained consisting of a greenish-brown odorless liquid having a yellowish iridescent foam, said product characterized by its wound healing properties.

11. A wound healing agent consisting of hemolyzed blood partially hydrolyzed by a proteolytic enzyme in a medium having a pH between 6 and 9 and characterized by its dark brown color, fluffy powder form, absence of protein material, solubility in methyl and amyl alcohol and water, insolubility in ether and propylene glycol, absence of amino acids, a pH from about 7.0 to about 7.8 and its wound healing properties.

12. A process of preparing a wound healing agent from blood comprising, defibrinating the blood, hemolyzing the defibrinated blood, subjecting the hemolyzed defibrinated blood to hydrolysis with a proteolytic enzyme in a medium having a pH between 6 and 9 until a product is obtained consisting of a greenish-brown odorless liquid having a yellowish iridescent foam, and discontinuing the hydrolysis.

13. A process of preparing a wound healing agent from hemolyzed blood comprising, lyophilizing the hemolyzed blood, subjecting the lyophilized blood to hydrolysis with a proteolytic enzyme in a medium having a pH between 6 and 9 until a product is obtained consisting of a greenish-brown odorless liquid having a yellowish iridescent foam, and discontinuing the hydrolysis.

References Cited in the file of this patent

UNITED STATES PATENTS

| | | |
|---|---|---|
| 2,369,111 | Parfentjev | Feb. 6, 1945 |

FOREIGN PATENTS

| | | |
|---|---|---|
| 207,573 | Great Britain | Nov. 30, 1923 |

OTHER REFERENCES

Fildes: But. J. of Exptl. Pathology, vol. 1, 1920, pp. 129 and 130.

Glass: J. Pathol. and Bacteriology, vol. 49, No. 3, November 1939, pp. 549–561 (pp. 549–552 and 560 relied upon).

Heyningen: Nature, vol. 162, No. 4107, July 17, 1948, pp. 114, 115.

Heyningen: J.A.M.A., vol. 145, No. 7, February 17, 1951, p. 508.

Zilber: Chem. Abstr., vol. 41, 1947, p. 7683.

Barnard: J.A.P.A., vol. 34, July 1945, pp. 180 and 181.

Lemberg: Hematin Compounds and Bile Pigments, 1949, Intersci. Pub., N.Y.C., p. 577.